Aug. 6, 1935.  J. B. CICERO ET AL  2,010,219
COOKING AND FRYING APPARATUS
Filed Sept. 4, 1934  2 Sheets-Sheet 1

INVENTORS
Joaquin B. Cicero
Charles Rice
BY Jack Ashley
ATTORNEY.

Aug. 6, 1935.  J. B. CICERO ET AL  2,010,219
COOKING AND FRYING APPARATUS
Filed Sept. 4, 1934  2 Sheets-Sheet 2
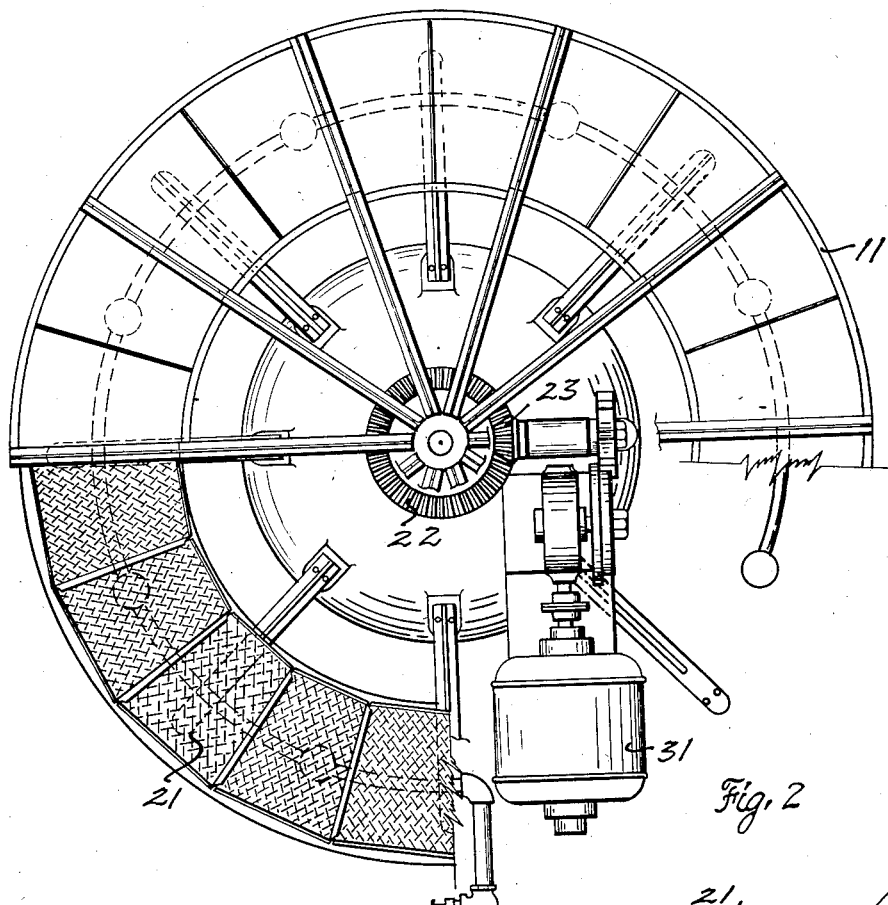
Fig. 2
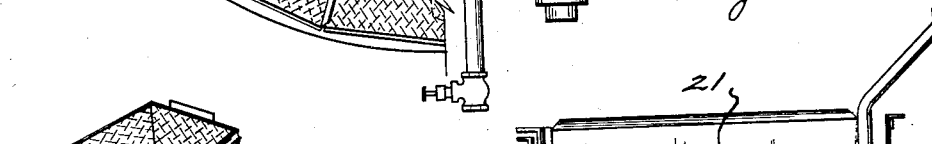
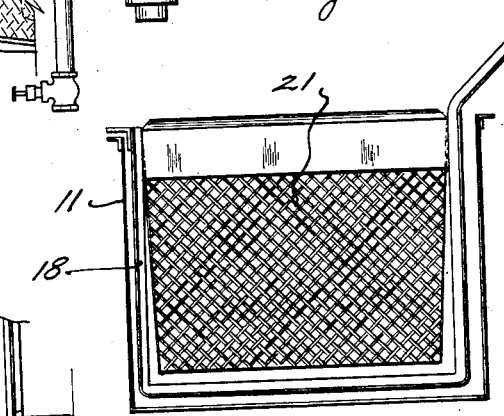
Fig. 5
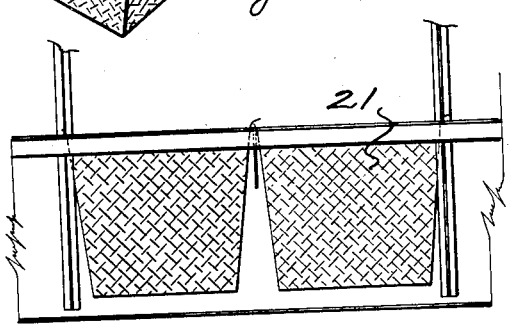
Fig. 4
Fig. 6
INVENTOR.
Joaquin B. Cicero
Charles Rico
BY
Jack Ashley
ATTORNEY.

Patented Aug. 6, 1935

2,010,219

UNITED STATES PATENT OFFICE 2,010,219

COOKING AND FRYING APPARATUS

Joaquin B. Cicero and Charles Rieg,
San Antonio, Tex.

Application September 4, 1934, Serial No. 742,556

2 Claims. (Cl. 53—7)

This invention relates to new and useful improvements in frying apparatus.

One object of the invention is to provide an improved machine for deep frying, or cooking dough products in a continuous process.

Another object of the invention is to provide an improved machine for cooking dough products which includes means for passing the products through a bath of cooking oil and which has means for stopping the travel of said products through the oil only long enough to remove the cooked article and to introduce more raw dough.

An important object of the invention is to provide an improved machine for cooking dough products including a plurality of containers for the product to be cooked which are arranged to travel through an oil bath, said machine having means for intermittently stopping the travel of the container to permit raw dough to be fed into the containers.

A further object of the invention is to provide an improved machine for cooking dough products having means for passing the products continuously through a hot oil bath until cooked.

A further object of the invention is to provide an improved machine for bulk frying of raw products in contra-distinction to frying and handling individual pieces.

Still another object of the invention is to provide an improved machine for deep frying, or cooking dough products which includes a plurality of removable containers for carrying the dough products, said containers being arranged to travel through a hot oil bath whereby the products therein are cooked; and controlling means for intermittently stopping the travel of containers, whereby each may be removed individually when the products therein are cooked.

A construction designed to carry out the invention will be hereinafter described, together with other features of the invention.

Figure 1:
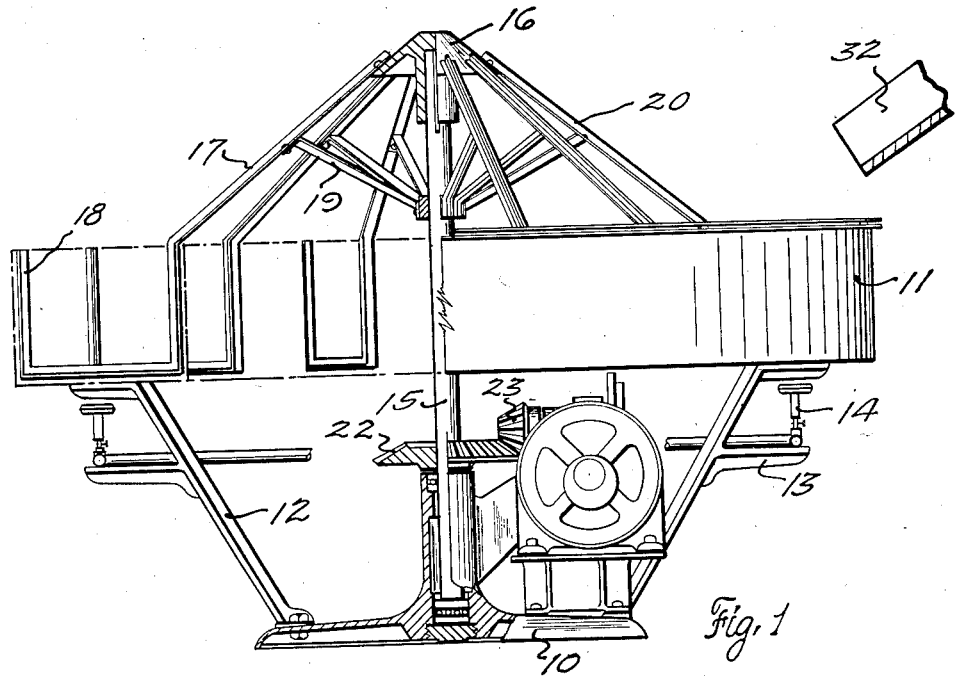
Figure 3:
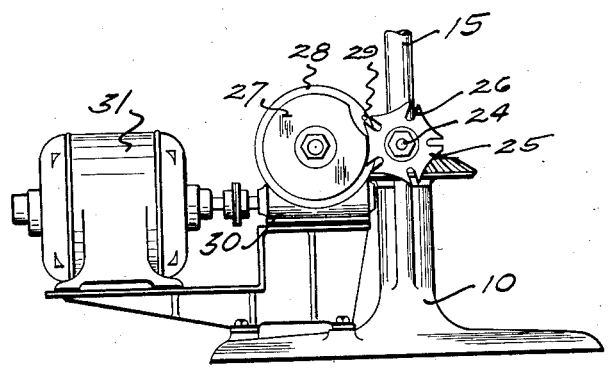

The invention will be more readily understood from a reading of the following specification and by reference to the accompanying drawings, in which an example of the invention is shown, and wherein:

Figure 1 is a side view, partly in elevation and partly in section, of a machine constructed in accordance with the invention, Figure 2 is a plan view, having a portion broken away to show the containers and also the drive mechanism, Figure 3 is a side elevation of the motor and drive mechanism, Figure 4 is an isometric view of one of the containers, Figure 5 is a enlarged sectional detail showing one of the containers mounted in the machine, and Figure 6 is another detail of the container mounting.

In the drawings, the numeral 10 designates a pedestal or base 10 which forms the main support for the machine. This base may be constructed of cast iron, or other suitable metal, and a circular oil trough 11 is mounted above the base concentrically thereto. The trough which is preferably made of steel, or other metal, is of a larger diameter than the base and is supported by a plurality of legs, or bars 12 which extend upwardly from the base 10, whereby the trough is rigidly secured to said base.

The legs are fastened to the underside of the trough at some distance from the periphery thereof and each leg is provided with an outwardly extending arm 13, preferably integral therewith. Each arm supports a Bunsen burner or other heater 14, whereby the oil in the trough may be heated. The legs are preferably spaced at equidistant points around the base and trough so that the burners are equally spaced beneath the trough, so that the oil within said trough may be held at an even temperature throughout.

A vertical shaft 15 has its lower end journaled in the center of the base 10 and extends upwardly therefrom. On the upper end of the shaft, I mount a revoluble structure 20 which includes a conical hub 16 keyed on the upper end of said shaft, whereby said hub rotates with the shaft. Radiating from the sides of the conical hub, and suitably secured thereto are a plurality of arms 17 which incline downwardly to the inner periphery of the oil trough. At this point each arm is bent upon itself to conform to the shape of the trough, whereby a U-shaped holder 18 is formed. Each holder, as clearly shown in Figs. 1 and 5, is positioned within the trough with only sufficient clearance so that said holder may move easily within said trough. The arms 17 and holders 18 are preferably constructed of steel because of their contact with the hot oil in the trough, but the invention is not to be so limited. Suitable brace bars 19 may connect the arms 17 near their upper ends, with the conical hub to reinforce the structure. It will be seen that the hub 16, arms 17, holders 18 and brace bars 19, comprise the revoluble structure 20.

It is obvious that when the shaft 15 is rotated, the structure 20 will be revolved and the holders 18 will be moved through the circular trough 11 which contains the hot oil. Removable containers 21, such as wire baskets, or the like, are supported in the holders 18 (Fig. 2). These baskets are merely set within the holders and are frictionally held therein, being readily removable. The product to be cooked, or fried, is placed in these containers and when the shaft 15 is rotated to revolve the structure 20, the product which is carried in the baskets 21 contacts the hot cooking oil as said baskets travel through the circular trough.

For transmitting motion to the shaft 15, a bevel gear 22 is secured to the shaft, above the base member 10. This gear is in constant mesh with a bevel pinion 23 which is mounted on the inner end of a stub shaft 24. The outer end of this shaft carries a star wheel 25 which is provided with equidistant slots 26 in its marginal portion. The periphery of the star wheel rides on the periphery of a circular disk 27 which is secured to a rotating disk 28. This latter disk 28 is provided with a pin 29 which is positioned near the edge of the same and arranged to engage in the slots 26 of the star wheel as the disk 28 rotates, whereby intermittent movement is transmittted to the star wheel shaft 24. This arrangement is commonly known as a Geneva movement.

The disk 28 has connection through a reduction gearing 30 with an electric motor 31 which is mounted on a support 32 carried by the base. It is obvious that as the disk 28 rotates, the pin 29 will engage one of the slots 26 to rotate the star wheel a pre-determined distance. This will rotate the stub shaft 24, and the shaft 15 will then be rotated through the bevel pinion 23 and gear 22. This will revolve the structure 20, whereby the containers 21 and products carried thereby will travel through the hot oil in the trough 11.

When the pin 29 disengages from the slot 26, then the star wheel stops and the revoluble structure 20 also stops. The parts remain stationary until the disk 28 rotates around so that the pin 29 engages the next slot 26, at which time the star wheel is again rotated until the pin disengages this slot. Thus, it will be seen that with the disk 28 and star wheel the intermittent movement is imparted to the revoluble structure 20, whereby the containers 21 are moved through the oil trough in steps.

The Geneva movement may be adjusted so that each basket will successively move under and stop beneath a discharge chute 32 from which the raw dough is discharged. With this arrangement, each basket 21 will stop beneath the chute long enough to receive raw dough to be cooked. The structure 20 will then revolve to move the next basket under the chute and the products in the other baskets will be moved through the hot cooking oil in the trough.

At the same time that the raw dough is entered into one of the baskets 21 during the intermittent stops, the baskets containing the cooked products which have been in the trough some time may be removed and empty baskets substituted therefor. The trough is of such size that one complete revolution of the structure 20 will cook the product within the containers 21. It is pointed out that the starting and stopping of the containers is entirely automatic, the only manual operation being the removal and replacement of the containers. The trough and holders 18 are preferably constructed of steel, as these parts are constantly subjected to the hot oil.

The device is particularly adapted for use in completing the manufacture of crisp, fried dough products such as ricos (Mexican corn dough), fried tortillas, pretzels or potato chips, but the invention is not to be limited to such use, as various uses of the same may be found. The simplicity and inexpensiveness of construction, as well as the efficiency of operation are obvious. There are no adjustments to be made, and once the motor 31 is started, the operation is automatic.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What we claim and desire to secure by Letters Patent is:

1. A frying apparatus comprising, a circular trough for containing hot cooking liquid, a moving carrier traveling contiguously in the trough and stopping intermittently, and foraminous containers immersed in the liquid in the trough and supported by the carrier, each container being mounted in the carrier to be manually removed from both the trough and the carrier for replacement by the containers during the stopping period of the carrier.

2. A cooking apparatus comprising a pedestal base structure, a circular trough for cooking liquid, supports connected with said pedestal base for supporting said trough concentrically thereof and in an elevated position, heating elements for heating the cooking liquid at spaced intervals under said trough supported by said trough supports, a revolvable structure journaled in said pedestal base including container holders extending into said trough, removable containers immersed in the cooking liquid in the trough and supported by said container holders, an electric motor mounted on said pedestal base for rotating said revolvable structure, and a driving connection between said motor and said revolvable structure operable to rotate it with an intermittent step by step movement.

JOAQUIN B. CICERO.
CHARLES RIEG.